(No Model.)
J. BRAUN.
PULLEY.
No. 294,110. Patented Feb. 26, 1884.
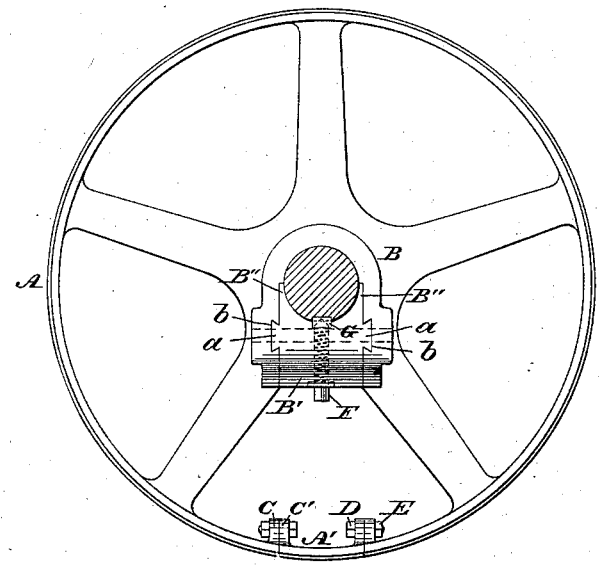
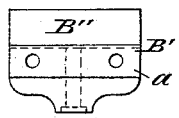
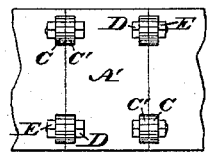
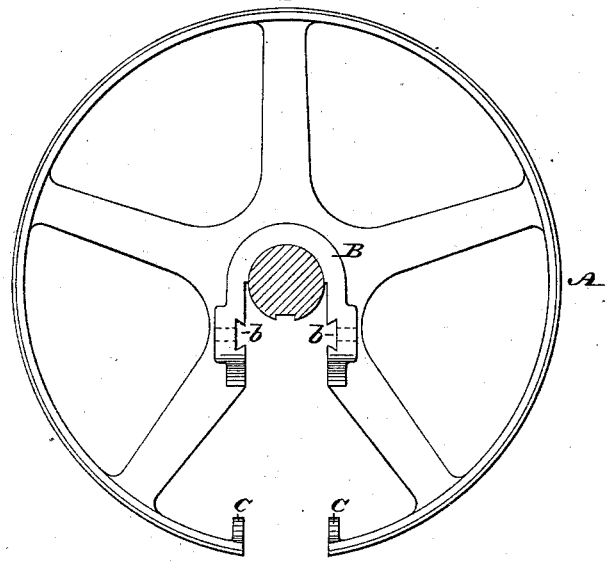
WITNESSES:
L. Douville
W. F. Kircher
INVENTOR:
John Braun,
BY John A. Wiedersheim
ATTORNEY.

UNITED STATES PATENT OFFICE.

JOHN BRAUN, OF PHILADELPHIA, PENNSYLVANIA.

PULLEY.

SPECIFICATION forming part of Letters Patent No. 294,110, dated February 26, 1884.

Application filed November 8, 1883. (No model.)

*To all whom it may concern:*

Be it known that I, JOHN BRAUN, a citizen of the United States, residing in the city and county of Philadelphia, and State of Pennsylvania, have invented a new and useful Improvement in Pulleys, which improvement is fully set forth in the following specification and accompanying drawings, in which—

Figure 1 is a side elevation of a pulley embodying my invention. Figs. 2, 3, and 4 are views of detached parts thereof. Fig. 5 is a side elevation of the pulley, certain parts thereof being removed.

Similar letters of reference indicate corresponding parts in the several figures.

My invention consists of a pulley provided with detachable parts, whereby it may be readily and conveniently fitted to and removed from a shaft, as will be hereinafter fully set forth.

Referring to the drawings, A represents a pulley whose circumferential rim between two adjacent arms is formed with a removable segment or section, A', and whose hub portion B is divided and receives in the space formed by the division a removable section, B', it being noticed that the section A' preserves the continuity of the rim and the section B' that of the hub.

In order to secure the section A' in position, the contiguous portions of the same and adjacent ends of the rim are formed with ears C C', in which are fitted bolts D, which, by means of suitable nuts, E, securely hold the section in position and connect the same with the remainder of the rim as one, it being seen that said ears, bolts, and nuts are on the inner face of the rim.

The section B' is formed on opposite sides with tongues $a$, which enter grooves $b$ on the inner face of the fixed portion of the hub, it being noticed that about one-half of said fixed portion is semi-cylindrical, and its ends are continued deflected in parallel lines, forming legs B'', which extend into the adjacent arms of the pulley, providing lengthened surfaces for the connection of the section B'.

In order to prevent displacement of the section B', I provide a screw-bolt, F, which passes through the same and tightens against the shaft, or a key, G, which is fitted to the section B' and the shaft or shafting, to which fastenings, however, I do not limit myself.

When the parts are in position shown in Fig. 1, the pulley may be removed from the shaft by releasing the fastenings of the sections A' B'. This displaces the section A' and permits the displacement of the section B', the latter being accomplished by sliding the section outwardly in a direction parallel with the shaft, the pulley then appearing as in Fig. 5. Owing to the passages left at coincident places at the hub and rim, the pulley may be raised clear of the shaft or turned around and lowered therefrom without disturbing said shaft. In order to apply the pulley in position, it is raised over the shaft and lowered thereon; or, if the passage left by the displaced section B' is above, the pulley is raised and directed to the shaft, the two passages heretofore stated permitting the pulley to pass to the shaft, the pulley then being turned to bring the openings underneath. The hub-section B' is now fitted to its portion, closing the passage previously existing and restoring the continuity of the hub, the tongues $a$ entering the grooves $b$ and interlocking the section and fixed portion of the hub. The section may then be fastened by means of the bolt F, and the hub portion as an entirety properly encircles the shaft. The section A' is located in its passage in the rim A, and the bolts D are passed through the ears C C', after which the nuts E are applied and tightened, whereby the section is firmly held in position, and the continuity of the rim of the pulley is preserved.

By the present construction I avoid the irregularity of split pulleys and the necessity of changing the arms usual in divided pulleys, it being seen that in my case the divisions in the rim and hub are between two adjacent arms, leaving the greater portions of the rim and hub and all of the arms intact.

Having thus described my invention, what I claim as new, and desire to secure by Letters Patent, is—

1. A pulley having a divided rim, and a divided hub in the portions between two adjacent arms, said rim and hub being provided each with sections independent of the other, closing the divisions of the rim and hub, substantially as and for the purpose set forth.

2. A pulley having its rim divided, and provided with a removable section occupying the space of the division, preserving the continuity of the rim, both ends of the section and of divided rim being formed with ears, in which fastening-bolts are fitted, substantially as and for the purpose set forth.

3. A pulley having its hub divided, and a section occupying the space of the division removably connected with the hub, in combination with a bolt passed through the section and tightening against the shaft, substantially as and for the purpose set forth.

4. A pulley formed of a rim having a removable section with ears and fastening-bolts, and a hub portion with a removable section tongued and grooved, and fastening devices, substantially as and for the purpose set forth.

JOHN BRAUN.

Witnesses:
A. P. GRANT,
W. F. KIRCHER.